US008265160B2

(12) United States Patent
Al-Kadi et al.

(10) Patent No.: US 8,265,160 B2
(45) Date of Patent: Sep. 11, 2012

(54) PARALLEL THREE-DIMENSIONAL RECURSIVE SEARCH (3DRS) MEANDERING ALGORITHM

(75) Inventors: Ghiath Al-Kadi, Eindhoven (NL); Andrei Sergeevich Terechko, Eindhoven (NL); Jan Hoogerbrugge, Eindhoven (NL); Abraham Karel Riemens, Eindhoven (NL); Klaas Brink, Eindhoven (NL)

(73) Assignee: NXP B.V., Eindhoven (NL)

( * ) Notice: Subject to any disclaimer, the term of this patent is extended or adjusted under 35 U.S.C. 154(b) by 396 days.

(21) Appl. No.: 12/573,205

(22) Filed: Oct. 5, 2009

(65) Prior Publication Data

US 2010/0328538 A1   Dec. 30, 2010

Related U.S. Application Data

(60) Provisional application No. 61/221,248, filed on Jun. 29, 2009.

(51) Int. Cl.
*H04N 7/12* (2006.01)
*H04B 1/66* (2006.01)

(52) U.S. Cl. .......... 375/240.16; 375/240.01; 375/240.24

(58) Field of Classification Search ............. 375/240.16, 375/240.01, 240.24
See application file for complete search history.

(56) References Cited

U.S. PATENT DOCUMENTS

| 7,236,634 | B2 * | 6/2007 | Miyakoshi et al. | 382/236 |
| 7,840,045 | B2 * | 11/2010 | Guo et al. | 382/128 |
| 2002/0009144 | A1 * | 1/2002 | Ishihara et al. | 375/240.16 |
| 2008/0215644 | A1 * | 9/2008 | Beric et al. | 707/205 |
| 2009/0225845 | A1 * | 9/2009 | Veremeev et al. | 375/240.16 |

OTHER PUBLICATIONS

Fluegel et al.:"A Highly Parallel Sub-Pel Accurate Motion Estimator for H.264" 2006 IEEE 8th Workshop on Multimedia Signal Processing, MMSP'06, Victoria Canada, Oct. 1, 2006, pp. 387-390, XP031011088 ISBN:978-0-7803-9751-4.*
Sebastian Fluegel et al, "A Highly Parallel Sub-Pel Accurate Motion Estimator for H.264", IEEE 8th Workshop on Multimedia Signal Processing, MMSP'06, Victoria, Canada, 2006, pp. 387-390.
Beric A. et al. "A Technique for Reducing Complexity of Recursive Motion Estimation Algorithms", Signal Processing Systems, IEEE Workshop on Aug. 27-29, 2003, XP-010661014, pp. 195-200.
Arnaldo Azevedo et al. "Parallel H. 264 Decoding on an Embedded Multicore Processor", XP-002603697, vol. 5409 2009 pp. 404-418.
Al-Kadi G. et al, "Meandering Based Parallel 3DRS Algorithm for the Multicore Era" Consumer Electronics (ICCE), 2010 Digest of Technical Papers International Conference, XP031640846, pp. 21-22.
de Haan, G. et al, "True-Motion Estimation with 3-D Recursive Search Block Matching", Circuits and Systems for Video Technology. IEEE Transactions, 1993, XP002603698, vol. 3, No. 5, pp. 368-379.

* cited by examiner

*Primary Examiner* — David Czekaj
*Assistant Examiner* — Anner Holder

(57) ABSTRACT

Various exemplary embodiments relate to a method and related motion estimation unit for performing motion estimation on video data comprising a plurality of frames. The method may begin by reading a current frame of the plurality of frames from a memory of a motion estimation unit. The method may then select a motion vector for each respective block of pixels in a current row of the current frame. The step of selecting the motion vector may include, for each respective block, selecting, by the motion estimation unit, a candidate vector for at least one block directly surrounding the respective block based on a determination of whether the directly surrounding block has been processed for the current frame, calculating, for each candidate vector, a difference value, and selecting, as the motion vector, the candidate vector with the lowest difference value.

20 Claims, 5 Drawing Sheets

Raster Scan A

Raster Scan B

PARALLEL THREE-DIMENSIONAL RECURSIVE SEARCH (3DRS) MEANDERING ALGORITHM

CROSS REFERENCE TO RELATED APPLICATIONS

This application claims the benefit of priority from U.S. Provisional Application Ser. No. 61/221,248, filed on Jun. 29, 2009, the disclosure of which is incorporated herein by reference in its entirety.

TECHNICAL FIELD

Various exemplary embodiments relate generally to motion estimation and more particularly, but not exclusively, to a parallel three-dimensional recursive search (3DRS) meandering algorithm.

BACKGROUND

Motion estimation techniques play an integral role in video compression and processing applications. As an example, scan rate up-conversion is a common feature implemented by many televisions. A number of modern televisions support frame rates up to 120 frames per second (fps), while the incoming signal may be represented at a lower frame rate. For example, many cable broadcasts include a signal at a native rate of 60 fps. Through the use of motion estimation and motion compensation techniques, a television may receive a 60 fps signal, but output a 240 fps display, thereby increasing clarity and reducing motion artifacts. In other words, by applying these techniques to the incoming frames, the television may interpolate 60 additional frames per second to fill in the gaps.

With the advent of high definition signals and advanced high resolution display technologies, such as Liquid Crystal Display (LCD) and Plasma, the amount of data included in video signals is rapidly increasing. As a corollary, as the amount of data increases, the amount of processing power required to perform real-time motion estimation also increases. Thus, hardware and software designers have given considerable attention to optimizing the algorithms used for motion estimation for real-time applications.

The Three-Dimensional Recursive Search (3DRS) algorithm, described in "True-Motion Estimation with 3-D Recursive Search Block Matching," by de Haan et al. (incorporated by reference herein) is one of the most widely-used motion estimation methods for applications requiring real-time, cost-effective processing. The 3DRS algorithm is based on block matching, such that a frame is divided into a number of pixel blocks and processing is performed for each such block. For each block, the algorithm calculates a motion vector representing the movement of the corresponding block from the previous frame. In order to determine the motion between frames, the 3DRS algorithm makes two assumptions: (i) objects are larger than a block of pixels; and (ii) objects have inertia. These assumptions suggest that motion in a particular block of pixels is related to motion of the surrounding blocks and that motion in the previous frame can represent motion in the current frame.

Given these assumptions, typical implementations of the 3DRS algorithm must follow a predetermined scanning order, as motion information is only available for the blocks that have already been processed. More specifically, when implementing a meandering scanning order, each block of pixels depends on a previous block of pixels in the same row and a number of blocks in the previously-processed row. These dependencies make it difficult to apply an effective parallelization technique to the algorithm. In other words, current implementations of the 3DRS algorithm are not fully scalable and do not map easily onto multi-core processors.

In view of the foregoing, it would be desirable to implement a parallelized 3DRS meandering motion estimation algorithm that does not compromise picture quality. It would also be desirable to implement a motion estimation device that allows for multi-core execution of the 3DRS motion estimation algorithm. Other desirable aspects will be apparent to those of skill in the art upon reading and understanding the present specification.

SUMMARY

In light of the present need for a parallelizable 3DRS meandering motion estimation algorithm, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related motion estimation unit for performing motion estimation on video data comprising a plurality of frames. The method may begin by reading a current frame of the plurality of frames from a memory of a motion estimation unit, the current frame comprising a plurality of rows. The method may then select a motion vector for each respective block of pixels in a current row of the current frame. The step of selecting the motion vector may include, for each respective block, selecting, by the motion estimation unit, a candidate vector for at least one block directly surrounding the respective block based on a determination of whether the directly surrounding block has been processed for the current frame, calculating, for each candidate vector, a difference value equal to the difference between the respective block in the current frame and the block corresponding to the candidate vector in a frame with a different time instance, and selecting, as the motion vector, the candidate vector with the lowest difference value. Processing at least one subsequent row may occur by repeating the step of selecting a motion vector for each block of pixels in at least one subsequent row prior to completion of processing of at least one block of the current row.

It should be apparent, for reasons described in further detail below, that the parallelized 3DRS motion estimation algorithm is scalable and can easily be mapped to multiple processing units, such as multithreaded/multi-core processors and co-processors. Furthermore, picture quality of the algorithm described herein is as good as or better than the original non-parallelized 3DRS algorithm for most video sequences.

BRIEF DESCRIPTION OF THE DRAWINGS

In order to facilitate better understanding of various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

As used herein, "frame" refers to an image, a field (e.g., in the case of interlaced video input), or a frame (e.g., in the case of film material or progressive formats). Other suitable objects for processing for motion estimation will be apparent to those of skill in the art and should be understood to be captured by the term "frame."

Furthermore, in the detailed description below, reference is made to processing in "rows." It should be apparent that processing of "rows" refers to processing of a sequence of adjacent blocks with respect to any orientation. In other words, processing may proceed left to right, right to left, top to bottom, bottom to top, or in any other suitable direction apparent to those of skill in the art.

Figure 1A:
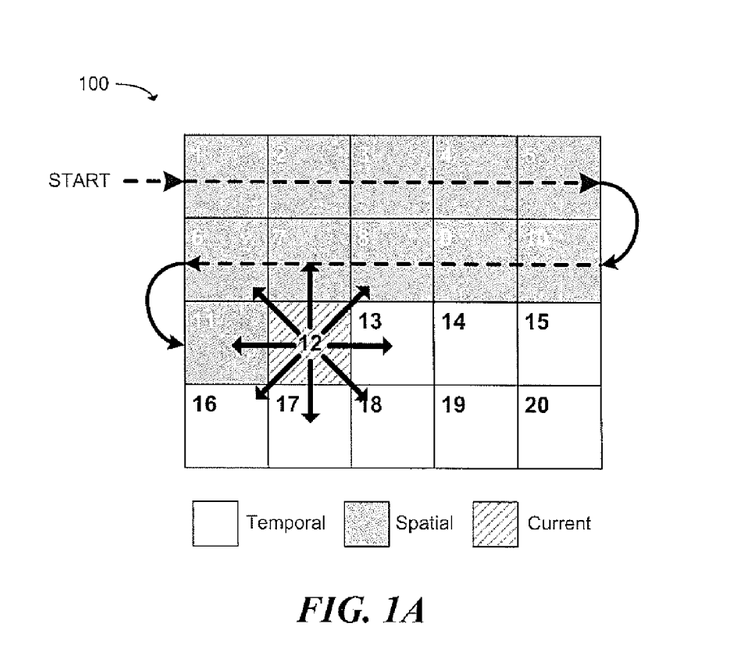
FIG. 1A is a schematic diagram of a meandering scan order used for processing blocks in a 3DRS algorithm.

FIG. 1A is a schematic diagram 100 of a meandering scan order used for processing blocks in a 3DRS algorithm. As used herein, the motion vectors determined for blocks of pixels in the current frame are referred to as "spatial candidates," while the motion vectors determined for blocks in a frame with a different time instance are referred to as "temporal candidates."

For each block to be processed, the algorithm may calculate a two-dimensional motion vector indicating displacement of a pixel or pixel block from the current location due to motion. As illustrated, the algorithm starts processing at block 1 and proceeds across the first row to block 5. After processing of block 5, execution proceeds to the second row, with processing of block 10, then across the second row, to block 6. Execution then proceeds to block 11 and, subsequently, block 12.

In typical implementations of the 3DRS algorithm, execution of block 12 could not proceed until the dependencies were satisfied for all directly surrounding blocks. More specifically, because block 12 is dependent upon spatial candidates corresponding to blocks 6, 7, 8, and 11, block 12 cannot be processed until a motion vector has been determined for each of these blocks for the current frame. In contrast, for blocks 13, 16, 17, and 18, the algorithm may rely on the motion vector for the block from the previous frame (i.e., the temporal candidate).

As should be apparent from this description, a typical implementation of a meandering 3DRS algorithm is parallelizable for multiple cores, but is not scalable and efficient due to synchronization, memory latency, required bandwidth, and a number of other factors. As a result, utilizing multiple cores for a meandering 3DRS algorithm fails to provide performance gains proportional to the number of cores used.

Figure 1B:
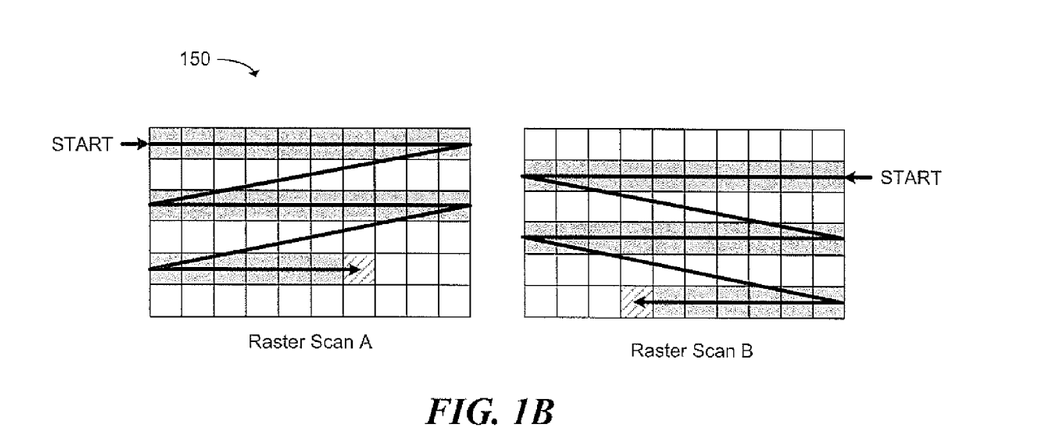
FIG. 1B is a schematic diagram illustrating the decomposition of one meandering scan into two raster scans.

FIG. 1B is a schematic diagram 150 illustrating the decomposition of one meandering scan into two raster scans, Raster Scan A and Raster Scan B. As illustrated, Raster Scan A starts processing with a first block of a first row, then proceeds across the row. After processing of the last block in the first row, execution jumps to the first block of the third row, then proceeds across the third row. Raster Scan A continues execution in this manner until all odd rows have been processed.

Similarly, Raster Scan B starts processing with a last block of the second row, then proceeds across the row. After processing of the first block in the second row, execution jumps to the last block of the fourth row, then proceeds across the fourth row. As with Raster Scan A, Raster Scan B continues execution in this manner until all even rows have been processed.

Various exemplary embodiments disclosed herein enable a combination of the benefits of the meandering scan and raster scan. In particular, as described in further detail below, various exemplary embodiments allow for the scalable parallelization of the raster scan, while providing the superior convergence properties of the meandering scan. In particular, because the scan direction alternates between lines, the algorithm results in propagation toward the motion of the object itself, rather than the direction of the scan, thereby resulting in a visible increase in picture quality.

Figure 2:
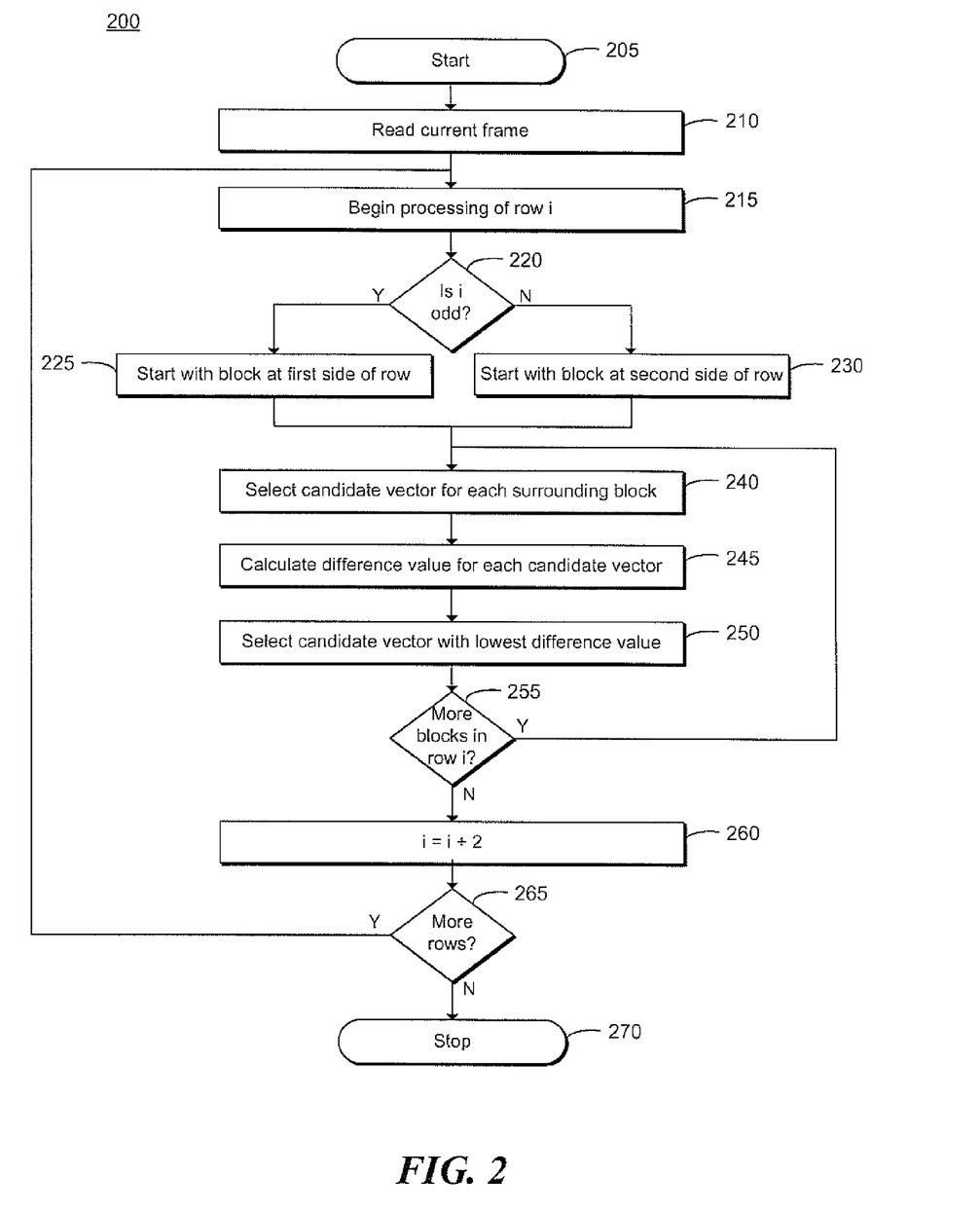
FIG. 2 is a flowchart of an exemplary method of performing a parallelized meandering 3DRS algorithm.

FIG. 2 is a flowchart of an exemplary method 200 of performing a parallelized meandering 3DRS algorithm. Method 200 may be executed by, for example, a motion estimation unit, such as the one illustrated in FIG. 5, described in further detail below. Other suitable components for execution of method 200 will be apparent to those of skill in the art.

Method 200 illustrates a modified 3DRS algorithm as executed on a first group of rows. Thus, a particular processor may execute all even rows or, alternatively, all odd rows. It should be apparent, however, that execution of the method is not limited to arrangements with two processors. Rather, any number of processors or co-processors may be used. For example, if four processors are used, each processor may execute one row, every four rows. Regardless of the number of processors used, each of the processors may begin processing substantially simultaneously, such that the algorithm is parallelized. Other suitable arrangements and execution schemes will be apparent to those of skill in the art.

Method 200 starts at step 205 and proceeds to step 210, where a particular processor or co-processor of the motion estimation unit reads the current video frame from memory. The current frame may comprise a plurality of pixels and may be broken into a plurality of rows and columns, each consisting of a number of blocks.

After reading the frame from memory, method 200 proceeds to step 215, where a particular processor or co-processor of the motion estimation unit begins processing of a row i. As an example, if the processor is to process all odd rows, the processor may begin with the first row in the frame, such that i=1. Alternatively, if the processor is to process all even rows, the processor may begin with the second row in the frame, such that i=2.

Method 200 then proceeds to decision step 220, where the processor determines whether i is odd. When i is odd, method 200 proceeds to step 225, where the processor determines that execution of the algorithm on row i is to proceed from a first side of the row. Alternatively, when i is even, method 200 proceeds to step 230, where the processor determines that execution of the algorithm on row i is to proceed from a second side of the row, opposite the first side.

After selecting an appropriate side of the row for start of execution in step 225 or step 230, method 200 proceeds to step 240, where the processor begins processing to determine a motion vector representing the estimated motion of the current block. In particular, in order to simplify processing, the processor may select a motion vector for the current block from a group of candidate vectors, each corresponding to one of the current block's neighbors. According to various exemplary embodiments, the processor may modify the candidate selection procedure based on a determination of whether the directly surrounding block has been processed for the current frame. More specifically, the processor may process each directly surrounding block to add a previously-calculated vector corresponding to that block to a set of candidate vectors.

As described in further detail below in connection with FIG. 3, the processor may first determine whether the particular directly surrounding block has been processed for the current frame. When the directly surrounding block has been processed for the frame, this indicates that a spatial candidate vector is available for that block, and the processor may therefore add this vector to the set of candidate vectors. Alternatively, when the directly surrounding block has not been processed for the frame, the processor may determine whether an indirectly surrounding block has been processed for the current frame. As an example, the processor may determine whether the indirectly surrounding block in the same column as the surrounding block, two rows from the current row, has been processed for the current frame. It should be apparent, however, that the indirectly surrounding block is not limited to this specific block. Rather, the processor may access any block that is not a directly surrounding block.

When the indirectly surrounding block has been processed for the current frame, the processor may add this vector to the candidate set. Finally, if neither the directly surrounding block nor an indirectly surrounding block has been processed for the frame, the processor may select a temporal candidate vector, which corresponds to the calculated vector of the surrounding block from a frame with a different time instance (i.e., a directly previous frame, indirectly previous frame, directly subsequent frame, or indirectly subsequent frame).

It should be apparent that, by selecting a candidate vector based on the execution status of the algorithm, the algorithm can be parallelized without sacrificing accuracy. In particular, by preferentially using a candidate vector calculated for the current frame from either the directly surrounding block or an indirectly surrounding block, the algorithm may give priority to spatial candidates, thereby leading to more accurate motion information.

After adding a candidate vector for at least one directly surrounding block to the set of candidate vectors, method 200 proceeds to step 245, where the processor calculates a difference value for each vector in the set. The difference value for the candidate vector may represent the accuracy of the motion estimation when the candidate vector is used to represent motion of the respective block from the previous frame.

In particular, the processor may identify a first match region in the current frame corresponding to the position of the respective block. The processor may also identify a second match region in a frame with a different time instance, where the location of the second match region corresponds to the current block's location translated by the candidate vector. After selecting the two match regions, the processor may then compare the pixels of the two match regions to determine the difference value.

As will be apparent to those of skill in the art, a number of different match regions may be used. For example, the processor may select match regions of the same size of the current block, larger than the current block, or that are subsamples with respect to the current block. Similarly, as will also be apparent to those of skill in the art, the processor may select the match regions to account for vector splitting situations.

After selecting appropriate match regions, the processor calculates the difference value by comparing the two match regions. As an example, the difference value may be calculated by determining the Sum of Absolute Differences (SAD) between pixels values of the two regions. Other suitable methods for calculating the difference value will be apparent to those of skill in the art. For example, the calculation of the difference value could be based on another difference measure and/or other measures (e.g., penalty values that depend on candidate vector characteristics). After calculating a difference value for each candidate vector, method 200 proceeds to step 250, where the processor selects the candidate vector with the lowest difference value as the motion vector for the current block.

Method 200 then proceeds to step 255, where the processor determines whether there are additional blocks to be processed in row i. When there are additional blocks to be processed, method 200 returns to step 240 for processing of the next block in the row. Alternatively, when all blocks in the current row have been processed, method 200 proceeds to step 260.

In step 260, the processor increments the value of i to obtain the row number of the next row to be processed. For example, when the motion estimation unit includes two processors or co-processors, the processor may increment the value of i by 2. It should be apparent that this step may be modified based on the total number of processors included in the unit. For example, when the unit includes four total processors, the processor may instead increment the value of i by 4.

Method 200 then proceeds to decision step 265, where the processor determines whether there are additional rows to be processed. In particular, the processor may determine whether i is less than or equal to the total number of rows in the current frame. When there are additional rows to be processed, method 200 returns to step 215 for further processing. Alternatively, when there are no additional rows to be processed, method 200 proceeds to step 270, where method 200 stops.

Figure 3:
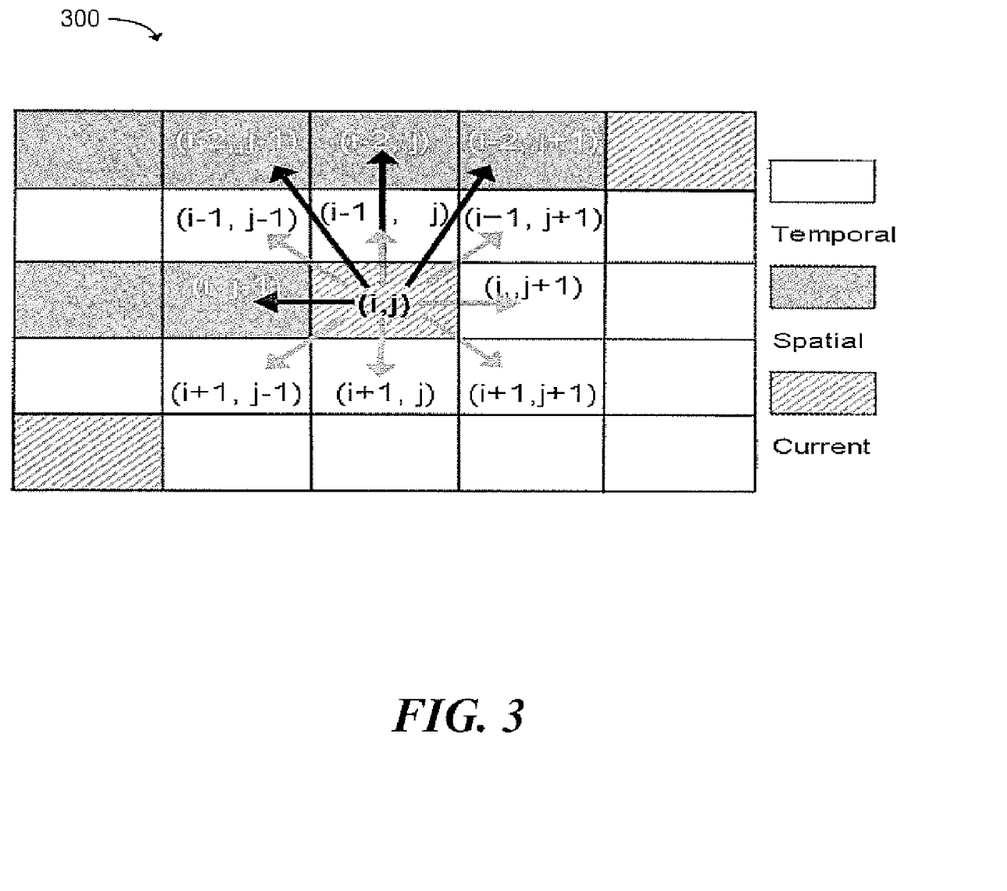
FIG. 3 is a schematic diagram illustrating an exemplary candidate block selection used in the parallelized meandering 3DRS algorithm.

FIG. 3 is a schematic diagram 300 illustrating an exemplary candidate block selection used in the parallelized meandering 3DRS algorithm. As illustrated, a motion estimation unit is currently processing three blocks in the frame, including block (i, j). During processing of block (i, j), the processor selects a candidate vector for each directly surrounding block. In particular, as illustrated, the processor may use the vector calculated for block (i, j−1) for the current frame (i.e., a spatial candidate vector), as this block has already been processed. As described in detail above, the motion estimation unit may determine that a spatial vector is not available for directly surrounding blocks (i−1, j−1), (i−1, j), and (i−1, j+1), and, as a result, use the spatial vectors for the indirectly surrounding blocks (i−2, j−1), (i−2, j), and (i−2, j+1). Finally, the motion estimation unit may use the calculated vector from a frame with a different time instance (i.e., a temporal candidate vector) for the blocks (i, j+1), (i+1, j−1), (i+1, j), and (i+1, j+1).

Figure 4A:
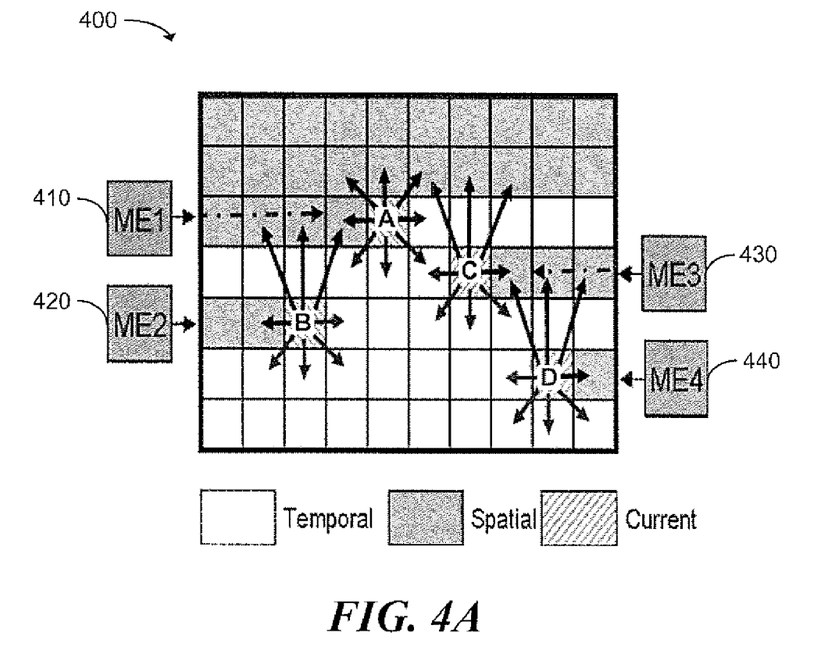
FIG. 4A is a schematic diagram of an exemplary parallelized meandering 3DRS algorithm in a first phase of execution.

FIG. 4A is a schematic diagram 400 of an exemplary parallelized meandering 3DRS algorithm in a first phase of execution. As illustrated, four motion estimation (ME) processors or co-processors, ME1 410, ME2 420, ME3 430, and ME4 440, are simultaneously processing the blocks in a current frame. ME1 410 and ME2 420 are currently processing rows 3 and 5, respectively, starting with the leftmost block of the rows. In contrast, ME3 430 and ME4 440 are currently processing rows 4 and 6, respectively, starting with the rightmost block of the rows. In particular, ME1 410 is currently processing block A, ME2 420 is currently processing block B, ME3 430 is currently processing block C, and ME4 440 is currently processing block D.

As illustrated, ME1 410 has selected four spatial candidates from the directly surrounding blocks, as the entire previous row has been processed, and four temporal candidates. ME2 420 has selected three spatial candidates from the indirectly surrounding blocks, as the directly surrounding blocks in row 4 have not been processed. ME2 420 has also selected one spatial candidate from the previously-processed block in row 5 and four temporal candidates. Similarly, ME3 430 has selected three spatial candidates from the indirectly surrounding blocks, one spatial candidate from the previously-processed block in row 4, and four temporal candidates. As with ME3 430, ME4 440 has selected three spatial candidates from the indirectly surrounding blocks, one spatial candidate from the previously-processed block in row 6, and four temporal candidates.

Figure 4B:
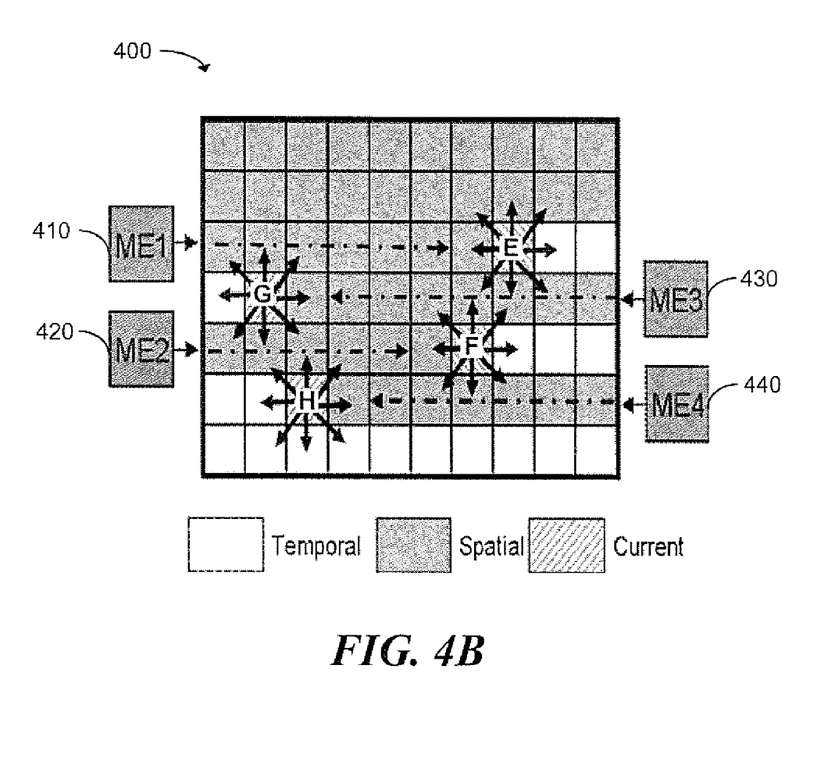
FIG. 4B is a schematic diagram of an exemplary parallelized meandering 3DRS algorithm in a second phase of execution.

FIG. 4B is a schematic diagram 400 of an exemplary parallelized meandering 3DRS algorithm in a second phase of execution. As illustrated, because ME1 410 and ME2 process left-to-right, while ME3 430 and ME4 440 process right-to-left, processing of the rows overlaps at around the halfway point of the row. As a result, this phase of execution will allow for selection of more spatial candidates from the directly surrounding blocks.

Thus, as illustrated, ME1 has selected seven spatial candidates and one temporal candidate from the blocks surrounding block E. Similarly, ME2 420 has selected seven spatial candidates and one temporal candidate from the blocks surrounding block F. ME3 430 has selected seven spatial candidates and one temporal candidate from the blocks surrounding block G. Finally, ME4 440 has selected four spatial candidates and four temporal candidates from the blocks surrounding block H.

It should be apparent that, in this manner, the motion estimation unit processors may dynamically select the candidate vectors based on the execution progress in time. Such a selection process ensures that the algorithm preferentially uses the spatial candidates, thereby ensuring high-quality estimation with minimal artifacts. Furthermore, because the algorithm dynamically selects candidate vectors, it avoids simultaneous switching from the first phase to the second phase for all rows, thereby avoiding the introduction of artifacts in the center of the image.

Figure 5:
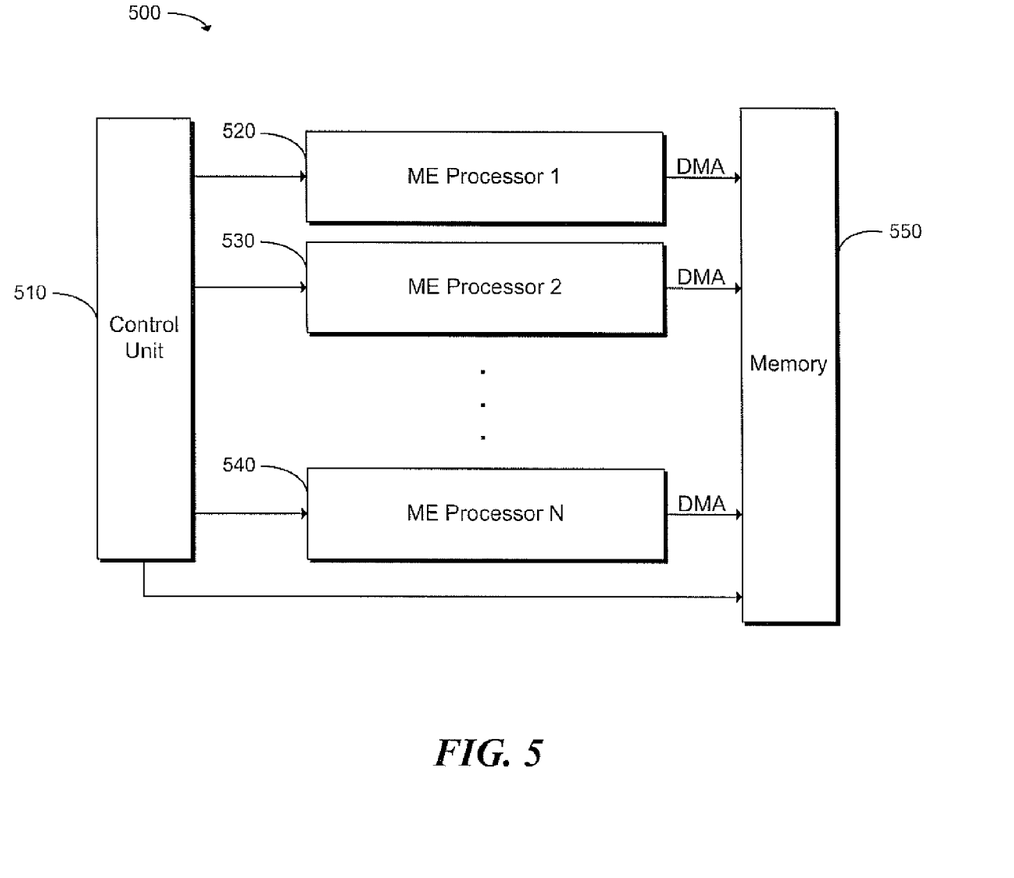
FIG. 5 is a schematic diagram of an exemplary motion estimation unit for implementation of a parallelized meandering 3DRS algorithm.

FIG. 5 is a schematic diagram of an exemplary motion estimation unit 500 for implementation of a parallelized meandering 3DRS algorithm. As illustrated, the motion estimation unit 500 may include a control unit 510, one or more processors or co-processors 520, 530, 540, and a memory 550.

Control unit 510 may be a circuit or other electronic arrangement designed to control the operation of the one or more processors or co-processors. In particular, control unit 510 may control the flow of data through the processors 520, 530, 540 and coordinate the activities of the processors 520, 530, 540. As an example, control unit 510 may perform the tasks of fetching, decoding, managing execution, and then storing results of the operations. When the 3DRS algorithm is implemented in a parallelized manner among multiple processors or co-processors 520, 530, 540, control unit 510 may coordinate scheduling and execution of the instructions used for implementation of the algorithm.

Motion estimation unit 500 may also include one or more processors or co-processors 520, 530, 540 for executing the instructions of the algorithm. As detailed above, the modified 3DRS algorithm may be parallelized, such that the processing of each row of blocks is performed by a particular processor among a group of processors 520, 530, 540.

The motion estimation unit may also include memory 550, which may be accessible by each processor 520, 530, 540 through direct memory access (DMA). Memory 550 may be, for example, synchronous dynamic random access memory (SDRAM), but is not limited to such configurations. Other suitable memory components will be apparent to those of skill in the art.

Memory 550 may be used to maintain data regarding the variables used in the execution of the algorithm and the results of the algorithm. Memory 550 may also store data indicating the execution progress of the algorithm, indicating, for each frame, whether processing of each block has completed. The processors or co-processors 520, 530, 540 may then access memory 550 in executing the algorithm, such that the algorithm may dynamically select candidate vectors for use in determining a motion vector of a particular block. Other suitable uses for the memory in the execution of the algorithm will be apparent to those of skill in the art.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine. Thus, a machine-readable storage medium may include read-only memory (ROM), random-access memory (RAM), magnetic disk storage media, optical storage media, flash-memory devices, and similar storage media.

According to the foregoing, various exemplary embodiments allow for a parallelizable 3DRS algorithm that is scalable to multiple processing units, thereby enabling a high-speed, effective solution for real-time motion estimation. Furthermore, because the algorithm provides the good convergence properties of the meandering scan, picture quality of the algorithm is as good as or better than the original non-parallelized 3DRS algorithm.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

We claim:
1. A method for performing motion estimation on video data comprising a plurality of frames, the method comprising:
reading, by a motion estimation unit, a current frame of the plurality of frames from a memory, the current frame comprising a plurality of rows;

selecting a motion vector, with a first processor, for each respective block of pixels in a current row of the current frame, wherein the step of selecting the motion vector comprises, for each respective block:
  selecting a candidate vector for at least one block directly surrounding the respective block based on a determination of whether the directly surrounding block has been processed for the current frame,
  calculating, for each candidate vector, a difference value indicating an accuracy of motion estimation when the candidate vector is used to represent motion of the respective block, and
  selecting, as the motion vector, the candidate vector with a lowest difference value; and
simultaneously processing, with a second processor, at least one subsequent row by repeating the step of selecting a motion vector for each block of pixels in the at least one subsequent row, wherein processing the at least one subsequent row with the second processor occurs in an opposite direction to processing of at least one block of the current row with the first processor.

2. The method for performing motion estimation according to claim 1, wherein the sub-step of selecting the candidate vector comprises, for the at least one directly surrounding block:
  determining whether the directly surrounding block has been processed for the current frame;
  when the directly surrounding block has been processed for the current frame, selecting a calculated vector of the directly surrounding block as the candidate vector;
  when the directly surrounding block has not been processed for the current frame, determining whether an indirectly surrounding block has been processed for the current frame; and
  when the indirectly surrounding block has been processed for the current frame, selecting a calculated vector of the indirectly surrounding block as the candidate vector.

3. The method for performing motion estimation according to claim 1, wherein the sub-step of calculating the difference value for each candidate vector comprises:
  selecting a first match region in the current frame, wherein the first match region corresponds to a position of the respective block;
  selecting a second match region in a frame with a different time instance than the current frame, wherein the second match region corresponds to the position of the respective block shifted by the candidate vector;
  calculating the difference value based on a comparison of the first match region and the second match region.

4. The method for performing motion estimation according to claim 1, wherein:
  when the current row is an odd row, the step of selecting a motion vector begins with a block at a first end of the current row and proceeds sequentially across the current row, and
  when the current row is an even row, the step of selecting a motion vector begins with a block at a second end of the current row opposite the first end and proceeds sequentially across the current row.

5. The method for performing motion estimation according to claim 4, wherein a first group of processors performs processing for odd rows and a second group of processors performs processing for even rows.

6. The method for performing motion estimation according to claim 5, wherein the first group of processors, beginning at a first end of each odd row, selects a motion vector for each respective block of pixels until reaching a block substantially halfway across each row, the second group of processors, beginning at a second end opposite the first end, selects a motion vector for every block of pixels in each even row, and the first group of processors, beginning at the block substantially halfway across each of the first groups of rows, completes processing of every block in each odd row.

7. A motion estimation unit for performing motion estimation on video data comprising a plurality of frames, the motion estimation unit comprising:
  a memory that stores a plurality of frames of the video data; and
  a plurality of processors, wherein, in processing a current row in a current frame of the plurality of frames, a first processor of the plurality of processors:
    reads the current frame from the memory, the current frame comprising a plurality of rows; and
    selects a motion vector for each respective block of pixels in the current row of the current frame, wherein the first processor, for each respective block:
      selects a candidate vector for at least one block directly surrounding the respective block based on a determination of whether the directly surrounding block has been processed for the current frame,
      calculates, for each candidate vector, a difference value indicating an accuracy of motion estimation when the candidate vector is used to represent motion of the respective block, and
      selects, as the motion vector, the candidate vector with a lowest difference value, wherein a second processor of the plurality of processors simultaneously processes a subsequent row in a direction opposite to processing by the first processor.

8. The motion estimation unit according to claim 7, wherein the memory stores data for each block of each frame indicating whether the processing has completed for each block, and the first processor accesses the data determine whether the at least one directly surrounding block has been processed for the current frame.

9. The motion estimation unit according to claim 7, wherein the memory is a synchronous dynamic random access memory (SDRAM).

10. The motion estimation unit according to claim 9, wherein at least one processor accesses the memory using direct memory access (DMA).

11. The motion estimation unit according to claim 7, further comprising:
  a control unit that coordinates execution of instructions by the plurality of processors.

12. The motion estimation unit according to claim 7, wherein at least one processor is at least one dedicated co-processor.

13. The motion estimation unit according to claim 7, wherein, for the at least one directly surrounding block, in selecting the candidate vector, the first processor:
  determines whether the directly surrounding block has been processed for the current frame;
  when the directly surrounding block has been processed for the current frame, selects a calculated vector of the directly surrounding block as the candidate vector;
  when the directly surrounding block has not been processed for the current frame, determines whether an indirectly surrounding block has been processed for the current frame; and
  when the indirectly surrounding block has been processed for the current frame, selects a calculated vector of the indirectly surrounding block as the candidate vector.

14. The motion estimation unit according to claim 7, wherein, in calculating the difference value for each candidate vector, the first processor:
  selects a first match region in the current frame, wherein the first match region corresponds to a position of the respective block;
  selects a second match region in a frame with a different time instance than the current frame, wherein the second match region corresponds to the position of the respective block shifted by the candidate vector; and
  calculates the difference value based on a comparison of the first match region and the second match region.

15. The motion estimation unit according to claim 7, wherein:
  when the current row is an odd row, the first processor begins the step of selecting a motion vector with a block at a first end of the current row and proceeds sequentially across the current row, and
  when the current row is an even row, the first processor begins the step of selecting a motion vector with a block at a second end of the current row opposite the first end and proceeds sequentially across the current row.

16. The motion estimation unit according to claim 7, wherein a first group of processors performs processing for odd rows and a second group of processors performs processing for even rows.

17. The motion estimation unit according to claim 16, wherein the first group of processors begins processing substantially simultaneously with the second group of processors.

18. The motion estimation unit according to claim 16, wherein the first group of processors, beginning at a first end of each odd row, selects a motion vector for each respective block of pixels until reaching a block substantially halfway across each row, the second group of processors, beginning at a second end opposite the first end, selects a motion vector for every block of pixels in each even row, and the first group of processors, beginning at the block substantially halfway across each of the first groups of rows, completes processing of every block in each odd row.

19. A machine-readable medium encoded with processor-executable instructions for performing motion estimation on video data comprising a plurality of frames, the machine-readable medium comprising:
  instructions for reading, by a motion estimation unit, a current frame of the plurality of frames from a memory, the current frame comprising a plurality of rows;
  instructions for selecting a motion vector, with a first processor, for each respective block of pixels in a current row of the current frame, wherein the instructions for selecting the motion vector comprise, for each respective block:
    instructions for selecting a candidate vector for at least one block directly surrounding the respective block based on a determination of whether the directly surrounding block has been processed for the current frame,
    instructions for calculating, for each candidate vector, a difference value indicating an accuracy of motion estimation when the candidate vector is used to represent motion of the respective block, and
    instructions for selecting, as the motion vector, the candidate vector with a lowest difference value; and
  instructions for simultaneously processing, with a second processor, at least one subsequent row by repeating the step of selecting a motion vector for each block of pixels in the at least one subsequent row, wherein processing of the at least one subsequent row with the second processor occurs in an opposite direction to processing of at least one block of the current row with the first processor.

20. The machine-readable medium according to claim 19, wherein the instructions for selecting the candidate vector comprise, for the at least one directly surrounding block:
  instructions for determining whether the directly surrounding block has been processed for the current frame;
  instructions for, when the directly surrounding block has been processed for the current frame, selecting a calculated vector of the directly surrounding block as the candidate vector;
  instructions for, when the directly surrounding block has not been processed for the current frame, determining whether an indirectly surrounding block has been processed for the current frame; and
  instructions for, when the indirectly surrounding block has been processed for the current frame, selecting a calculated vector of the indirectly surrounding block as the candidate vector.

* * * * *